United States Patent [19]

Taylor, III

[11] 4,255,502

[45] Mar. 10, 1981

[54] COVER FOR AUTOMOBILE BATTERIES

[75] Inventor: Milton E. Taylor, III, Chicago, Ill.

[73] Assignee: Michael D. Taylor, Chicago, Ill.

[21] Appl. No.: 73,259

[22] Filed: Sep. 7, 1979

[51] Int. Cl.³ .............................................. H01M 2/00
[52] U.S. Cl. .................................................... 429/163
[58] Field of Search ........................ 429/163, 175, 176

[56] References Cited

U.S. PATENT DOCUMENTS

| 3,825,447 | 7/1974 | Kraals | 429/175 |
| 3,859,142 | 1/1975 | Hart | 429/163 |

Primary Examiner—Charles F. LeFevour
Attorney, Agent, or Firm—James J. Conlon

[57] ABSTRACT

A flexible, fabric cover for automobile batteries is provided and includes a hinged top portion having a side extension extending partially down one side thereby providing an enlarged top opening for positioning a battery within the jacket. The top includes sections to accommodate top or side mounted battery terminals which may extend through the sections for attachment to battery cables. The jacket includes outer cover members joined at each of its four corners by a thin seam which forms a rigidifying rib to allow the jacket to stand upright. A fiber glass insulation is contained within the walls of the cover providing soft, puffed walls which fit snugly about a multitude of different size batteries. The fiberglass insulation may include a foil backing to provide added stiffness, improved rigidity, and better thermal insulating properties to the battery cover. The method is directed to the manner of manufacturing to provide puffed sides and stiffening seams at each corner.

7 Claims, 4 Drawing Figures

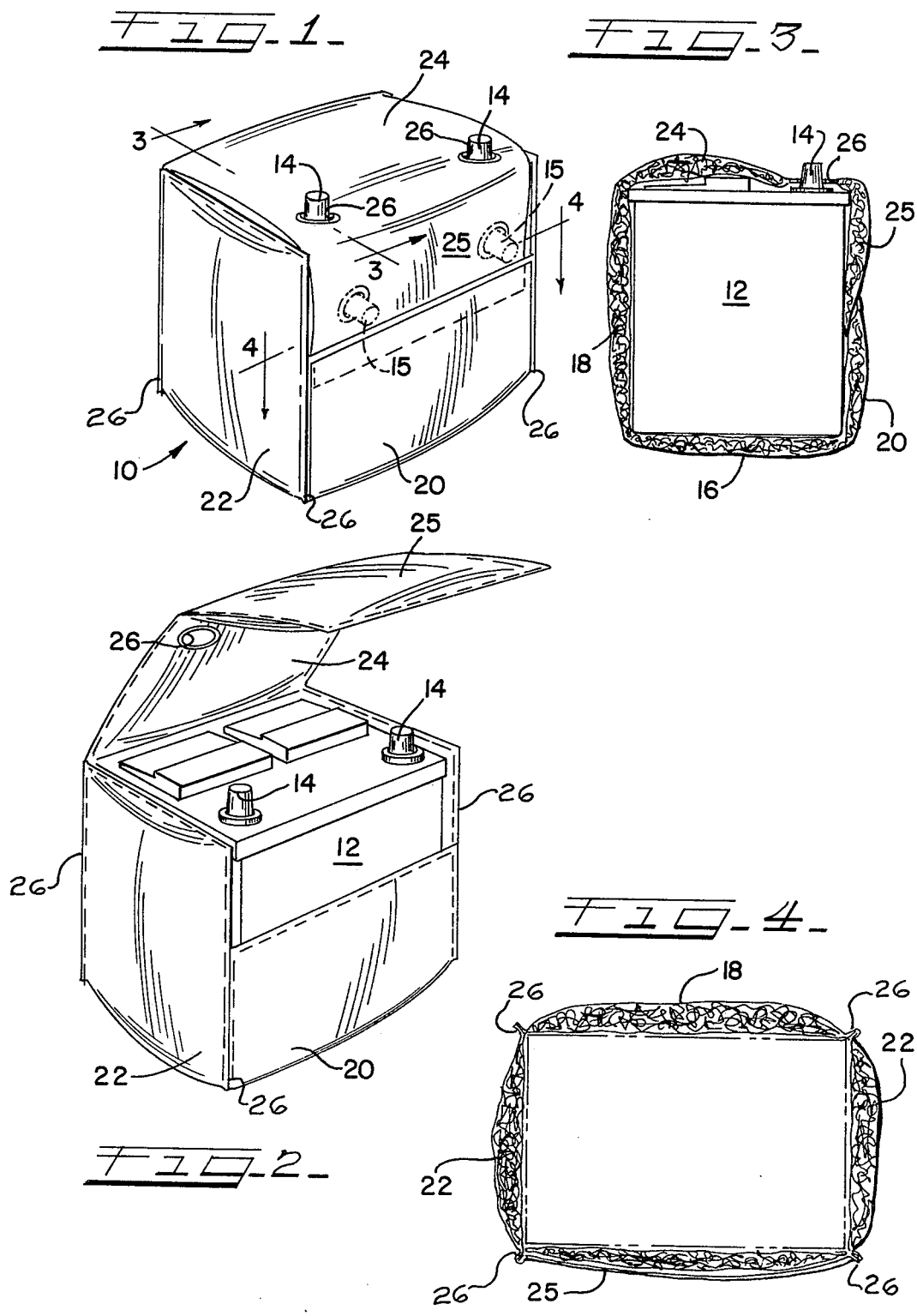

COVER FOR AUTOMOBILE BATTERIES

BACKGROUND OF THE INVENTION (1) Field of the Invention:

This disclosure pertains to covers for automobile batteries and in particular to removable, portable covers and a method of manufacturing. The battery covers may be positioned about the battery during extremely cold weather and easily removed when warm weather arrives.

(2) Description of the Prior Art:

Attempts have been made in the past to provide covers for batteries such as that shown in Kraals U.S. Pat. No. 3,825,477 (1974), which is directed to a polyethylene cover having an integrally formed sealing means for enclosing a battery to prevent corrosive fumes and fluids from contaminating the battery's surroundings. While other attempts have been made in the past to keep the battery from freezing or becoming extremely cold during winter weather, there has not been a successful product made available which is reliable and easily adapted to fit both side and top terminal batteries and which is constructed of low-cost materials making the battery jacket available to the majority of automobile owners.

SUMMARY

This disclosure pertains to an insulating jacket for automobile batteries into which the battery is placed during winter weather and which is intended to retain battery heat and protect the battery from extremely cold, chilling winds, which retard the efficiency and starting power of the battery.

The product disclosed herein provides a fabric or other type of inexpensive, flexible material in the form of a jacket having hollow walls which contain insulation. The insulation not only protects the battery from the chill factor of the wind, but also adds stiffness and rigidity to the battery jacket permitting the jacket to be located in a battery well inside the engine compartment of an automobile and allows the jacket to stand upright while an individual positions the battery into the jacket. Thus, the product disclosed herein is lightweight easily shipped, and easily stored when not in use and also can be positioned by an individual working alone.

The jacket is constructed of a fabric material permitting it to be soft, flexible and puffy to fit snugly about an automobile battery. The battery jacket includes a cover having an extension which extends downwardly along one side of the jacket to cover an enlarged top opening which permits the battery to be easily positioned in the battery jacket. The top includes a pair of openings to allow top mounted battery terminals to extend therethrough. The extension of the top also includes a pair of openings to fit about side mounted terminals which are common on many of the newer automobiles.

Each of the four corners do not contain insulation and provide a single, thin seam of fabric forming a rib for rigidifying the jacket and assisting it in standing upright.

The method disclosed is directed to the manner for making and using the cover.

It is an object of this disclosure to provide a battery cover constructed of a soft, pliable material having puffed sides and which can fit snugly about various sizes of automobile batteries which are available on market to securely insulate each from cold weather and also retain battery heat during cold weather.

It is another object of this disclosure to show a battery jacket having hollow wall portions into which a fiberglass or other suitable insulating material is fitted not only to obtain the thermal insulating properties of the fiberglass, but also to provide rigidity to the battery jacket to allow it to stand upright for placement of a battery therein by an individual working alone.

It is yet another object of this disclosure to show a battery jacket having enlarged top opening and a side extending partially to the top to provide the enlarged opening to permit the battery to be easily located within the jacket.

It is yet another object of this disclosure to show the battery jacket having a top with opening for battery terminals and also having an extension which extends partially down one side of the battery jacket and also contains a pair of openings that can be used to extend about side-mounted terminals.

Another object of the disclosure is to show a battery jacket having seams at all four corners which rigidify the jacket and assist it in standing upright and retaining the rectangular battery receptacle to receive a battery.

These and other objects of the disclosure will become apparent to those having ordinary skill in the art with reference to the following description, drawings and appended claims.

DESCRIPTION OF THE DRAWINGS

FIG. 1 is a pictorial illustration showing the battery jacket with a battery contained therein;

FIG. 2 is another view of the battery jacket showing the top just prior to being located about the battery;

FIG. 3 is a sectional view taken generally along lines 3—3 of FIG. 1;

FIG. 4 is another sectional view taken generally along lines 4—4 of FIG. 1.

DESCRIPTION

Referring now to the drawings, and in particular to FIG. 1, the battery jacket is designated generally with the numeral 10. As shown in FIG. 2, a battery 12 is located snugly within the cover 10 and includes a pair of top terminals 14. As shown in FIG. 1, the battery jacket 10 can also be adapted to accommodate a battery having a so-called side mounted terminals 15. The battery jacket 10 is produced with a provision for either side or top mounted terminals by providing a circular stiching in the fabric on both the top and bottom which could be cut out with a knife or similar sharp object or punched out as required depending upon whether or not the jacket is to accommodate a battery with top or side-mounted terminals.

As shown in the drawings, the battery jacket includes a full height back 18 extending upwardly from the bottom 16. Parallel with and spaced from the back 18 is a shortened front 20 which extends upwardly from the bottom 16 approximately half the distance of the back 18. A pair of sides 22 interconnect the back 18 and the front 20. The top 24 forms a continuation of the back 18 and is adapted to be folded over the battery top. Top 24 also includes a so-called extension 25 which forms a continuation of the front 20 when the top is positioned about battery 12. As mentioned earlier, the extension 25 may also include a pair of openings or locations where openings can be made to permit side mounted battery terminals to extend therethrough. The extension is of such a length as to extend over and beyond front wall 20 and may be tucked over the front wall alongside the battery to securely seal the battery within jacket 10.

In constructing the cover 10, a fiberglass insulation such as that manufactured by Owens Corning of Toledo, Ohio and having a foil backing is recommended. The fiberglass is such as that which comes in roll form and is used as insulation in walls of homes. This fiberglass insulation comes in both 3 and 4 inch thicknesses and either can be used. Further, in placing the insulation within the hollow portion of the jacket walls the insulation is somewhat compressed so as to provide a bulging or puffed wall having a thickness approximately one and one-half inches. By compressing the thicker fiberglass to this reduced dimension, the fiberglass provides a required degree of rigidity to the walls that permits the fabric to be able to stand upright. Thus, in such a rigidified form, the battery jacket 10 is adapted to stand upright when placed in the battery well of an automobile engine compartment and the battery can easily be placed within by an individual working alone.

A foil face fiberglass may also be used. The foil is very thin aluminum sheet and acts as an impermeable wind barrier which also re-radiates heat back into the battery. The foil face should be located away from the battery and adjacent the outside of the cover to act as an initial wind barrier.

As constructed, the side walls 22 are joined to the back 18 and front 20 by stitching which provides thin seams 26 having a thickness less than the thickness of the adjacent walls. Such a thin or narrow seam acts as a rigidifying rib at each of the four corners and may be located on the inside or outside of the jacket 10.

Thus, it has been shown by the foregoing that a unique battery cover or jacket 10 has been disclosed. The billowy or puffed construction allows batteries to fit snugly into the jacket 10 and the seams at each corner provide rigidifying seams or an integral, stiffening skeleton thus permiting the use of a very flimsy fabric and/or insulation material within the hollow area of the cover, bottom, and walls.

The method of manufacturing is directed to providing hollow wall portions, and inserting an insulating material which causes the walls to bulge when the side, vertical seams are joined. Thus, fiberglass or a suitable substitute can be inserted into the hollow wall portions after the walls are initially joined to form a battery receptacle. In the alternative, the insulation could be laid out flat, material placed on both sides with edges overlapping and joined initially before folding and joining the respective edges to form the battery receptacle. Joining the fabric edges causes a material bulging effect which reduces the battery receptacle size and insures that the protected battery will be contacted on all sides. As initially formed, the fabric of the cover provides a battery receptacle approximating the size of a standard battery. Upon insertion of the insulation, the receptacle size is reduced as the side walls, back, and front are bulged. Thus, when a battery is installed, the bulged sides fit snugly against the battery to reduce vibration and efficiently hold and insulate the battery.

The foregoing description and drawings merely explain and illustrate the invention and the invention is not limited thereto, except insofar as the appended claims are so limited, as those who are skilled in the art and have the disclosure before them will be able to make modifications and variations therein without departing from the scope of the invention.

I claim:

1. A battery jacket for providing a self-supporting receptacle adapted to receive an automotive battery having terminals and insulate and protect the battery from extreme cold and wind, the improvement comprising:
   a self-supporting, outer cover;
   said cover comprising a front, back, hinged top and sides;
   bottom means joining said front, back and sides;
   first seam means joining the front and said side walls;
   second seam means joining the back and said side walls;
   said first and second seam means disposed to extend upwardly from the bottom means and form skeletonized rigidifying means to permit said cover to be self-supporting;
   said cover comprising an inner layer of material and an outer layer of material and forming therebetween pocket means;
   insulating means located within said pocket means.

2. The battery jacket of claim 1 and:
   cover means;
   means connecting the cover means to the back wall of the outer cover;
   said cover means including means to provide an opening to receive said battery terminals;
   said cover also including a side extension adapted to extend beyond and be tucked between the front wall and said battery.

3. The battery jacket of claim 2 wherein said jacket includes;
   said front wall having a height less than the height of said side walls;
   said cover having said top adapted to extend across the top of a battery and parallel to the bottom of the battery jacket, and, also having an integrally connected side extension;
   said side extension having means connected to said top and means adapted to extend downwardly from said top;
   said side extension also having an overlapping portion adapted to be tucked alongside the adjacent, shortened front wall to seal out wind and cold from the enclosed battery.

4. The battery jacket of claim 3, wherein:
   said battery includes side-mounted terminals;
   said side extension includes preformed, stitched means adapted to provide reinforced openings for surrounding side-mounted battery terminals.

5. The battery jacket of claim 1 wherein:
   said insulation means contained within said packet means comprise a fiberglass insulation.

6. The battery jacket of claim 5 wherein said fiberglass insulation includes:
   elongated fiberglass filaments arranged in a layer form having a thickness, prior to installation in the jacket pockets, in the order of three to four inches;
   an aluminum foil attached to one surface of said fiberglass.

7. The battery jacket of claim 1 wherein said front, back, top and side walls comprise:
   puffed members filled with said insulation to reduce the normal size of the battery receptacle.

* * * * *